W. J. KOSTER.
ACCESSORY FOR FORD AUTOMOBILES.
APPLICATION FILED MAR. 10, 1919.

1,394,846.

Patented Oct. 25, 1921.
2 SHEETS—SHEET 1.

WITNESSES

INVENTOR

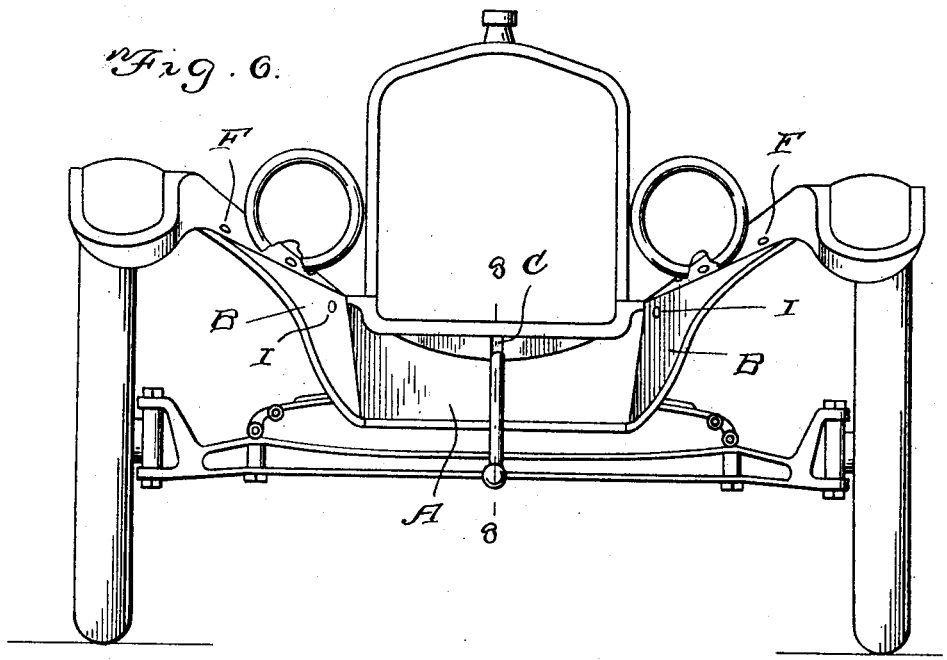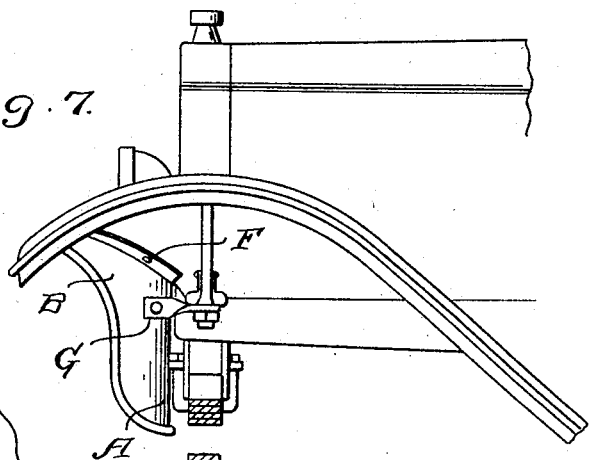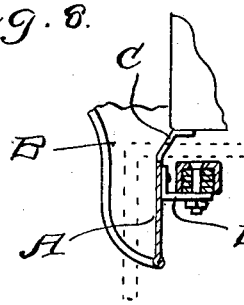

UNITED STATES PATENT OFFICE.

WILLIAM J. KOSTER, OF PETERBOROUGH, ONTARIO, CANADA, ASSIGNOR TO LOUIE FLORENCE, OF PETERBOROUGH, CANADA.

ACCESSORY FOR FORD AUTOMOBILES.

1,394,846.     Specification of Letters Patent.     Patented Oct. 25, 1921.

Application filed March 10, 1919. Serial No. 281,898.

*To all whom it may concern:*

Be it known that I, WILLIAM J. KOSTER, a subject of the King of Great Britain, residing at Peterborough, in the county of Peterborough, in the Province of Ontario and Dominion of Canada, have invented new and useful Improvements in Accessories for Ford Automobiles, of which the following is a specification.

The present invention has reference to an attachment for automobiles and has for its object to produce an attachment in the nature of a plate having simple means whereby the same may be attached to the front of an automobile to cover the space between the radiator and the frame to protect the pan from the entrance of dust through the front of the automobile, the said plate having at its ends wings which underlie and are secured to the front fenders of the automobile, the said wings being of a construction whereby the rays of light from the headlamps will be more effectively reflected to the sides and over the ground surface on which the vehicle travels.

The drawings illustrate a satisfactory embodiment of the improvement reduced to practice, and in the said drawings:—

Figs. 4 and 5 are elevations looking toward the opposite faces of the twisted link member employed.

Fig. 6 is a front elevation showing the improvement in applied position.

Fig. 7 is a side elevation thereof, parts of the automobile being in section and broken away.

Fig. 8 is a sectional view approximately on the line 8—8 of Fig. 6.

Figure 1:
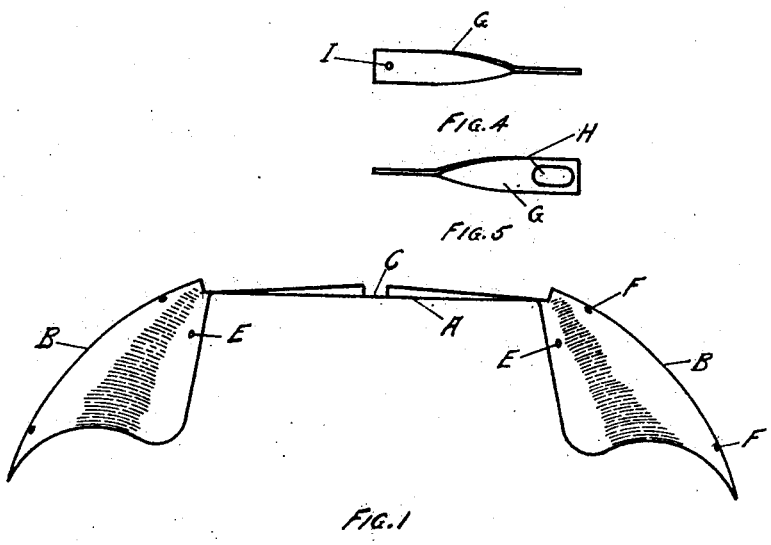
Figure 1 is a top plan view of the improvement.

Referring now to the drawings in detail, A designates the body plate of the improvement. The plate has its upper edge flanged rearwardly and is centrally provided with a slot C through which the starting crank of the engine of the automobile passes. The upper flanged edge of the plate A is designed to underlie and rest directly against the bottom of the radiator of the engine. The plate is of a length greater than the width of the radiator and has its ends which project beyond the sides of the radiator, of a greater width, upon the upper edge of the said plate than at the center thereof. The plate thus will rest against the front downwardly arched channeled end member of the frame or chassis. The channeled end member of the frame or chassis receives therein the central portion of the front spring of the automobile, the said spring being secured to the said end member by the usual clips and a bolt between the clips, the latter being engaged by a nut. On the center of the body plate A of the improvement there is a rearwardly extending slotted tongue D. The referred to bolt passes through the slot in the tongue and the nut for the said bolt contacts with the under face of the tongue, as clearly illustrated in Fig. 8 of the drawings.

Figures 2, 3:
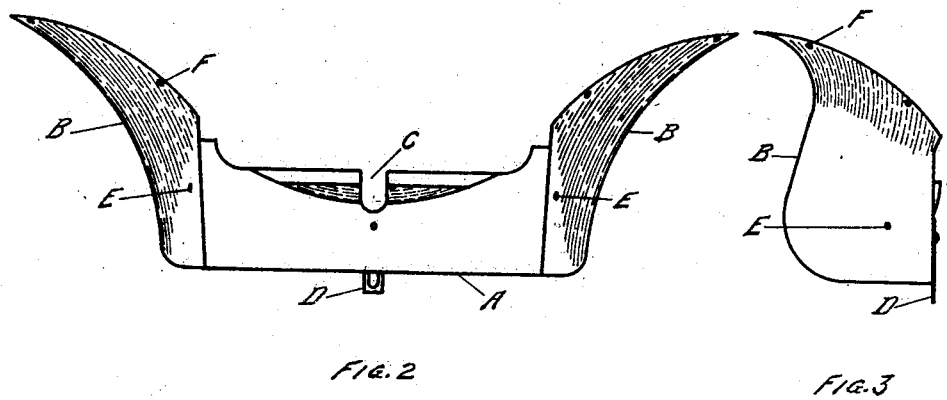
Fig. 2 is a front elevation thereof.
Fig. 3 is an end view thereof.

On the ends of the body plate A are formed oppositely curved wings B. These wings, as disclosed in Figs. 1 and 2 of the drawings are rounded in cross section both longitudinally and transversely, and the outer ends of the wings are of a greater width than the inner ends thereof. The wings are thus shaped to be received under the front fenders of the automobile, and said wings are bolted to the fenders. The bolts pass through the openings F in flanges provided at the upper edge of the wings. The front and rounded faces of the wings B are designed to serve as reflectors for the rays of light from the headlamps, the said lamps being arranged thereabove in the usual manner. The posts for the headlamps pass through openings in the automobile fenders and have their lower ends shouldered in the usual manner, and provided with reduced threaded projections from the shoulders which latter are provided with the usual nuts. On the inner face of each wing B, I secure by a rivet, bolt, or the like that passes through an opening I therein, twisted links G. The free ends of these links are provided with elongated slots, and through the slots the reduced threaded ends of the lamp posts pass. The nuts that engage the threaded ends of the lamp posts ordinarily secure the posts of the lamp brackets to the frame of the automobile but in this instance, the said posts are elongated and the said nuts are screwed against the under faces of the links G, thus effecting in sustaining the wing portion of the device on the front mud guards or fenders of the automobile.

Having thus described the invention, what I claim, is:—

In combination with the front of an automobile, having a starting crank, headlights, a radiator, a channeled member on the front of the frame below the radiator to which the front springs are bolted; of a protective device for the pan of the engine including a plate having its upper edge flanged inwardly to underlie and to rest against the radiator and the said channeled member, said plate having a central slot to receive therein the starting crank, an angle slotted tongue on the lower edge of the plate receiving the bolt that connects the spring to the channeled member and contacted by a nut which engages the bolt, outwardly rounded upwardly projecting wings on the ends of the plate underlying and secured to the front fenders of the automobile, said wings having their front portions serving as reflectors for the headlamps of the automobile, and twisted links secured to the plate at the juncture of the wings therewith having slotted portions receiving the posts of the lamp brackets therethrough and being contacted by the nuts which are screwed on the said posts of the said brackets.

In testimony whereof I affix my signature.

WILLIAM J. KOSTER.